United States Patent
Chopra et al.

(10) Patent No.: US 10,738,204 B2
(45) Date of Patent: Aug. 11, 2020

(54) PRINTING PROCESS FOR PREPARING CONTROLLED SCATTERING EFFECTS

(71) Applicants: Xerox Corporation, Norwalk, CT (US); Palo Alto Research Center Incorporated, Palo Alto, CA (US)

(72) Inventors: Naveen Chopra, Oakville (CA); Warren Jackson, San Francisco, CA (US); Steven E. Ready, Los Altos, CA (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/958,107

(22) Filed: Apr. 20, 2018

(65) Prior Publication Data
US 2019/0322881 A1    Oct. 24, 2019

(51) Int. Cl.
| | |
|---|---|
| *C09D 11/101* | (2014.01) |
| *C09D 11/34* | (2014.01) |
| *C09D 11/103* | (2014.01) |
| *C09D 11/107* | (2014.01) |
| *B41M 5/00* | (2006.01) |
| *B41J 11/00* | (2006.01) |

(Continued)

(52) U.S. Cl.
CPC .......... *C09D 11/101* (2013.01); *B41J 11/002* (2013.01); *B41M 3/001* (2013.01); *B41M 5/0023* (2013.01); *B41M 7/0018* (2013.01); *B41M 7/0081* (2013.01); *C09D 11/103* (2013.01); *C09D 11/107* (2013.01); *C09D 11/12* (2013.01); *C09D 11/34* (2013.01); *C09D 11/322* (2013.01)

(58) Field of Classification Search
CPC ..... C09D 11/101; C09D 11/12; C09D 11/107; C09D 11/103; C09D 11/34; C09D 11/322; B41M 7/0018; B41M 3/001; B41M 5/0023; B41M 7/0081; B41J 11/002
See application file for complete search history.

(56) References Cited

U.S. PATENT DOCUMENTS

| | | |
|---|---|---|
| 5,195,430 A | 3/1993 | Rise |
| 5,372,852 A | 12/1994 | Titterington et al. |

(Continued)

OTHER PUBLICATIONS

Prokhorov et al., Application of the three-component bidirectional reflectance distribution function model to Monte Carlo calculation of spectral effective emissivities of nonisothermal blackbody cavities, Applied Optics, Nov. 20, 2012, vol. 51, No. 33.

(Continued)

*Primary Examiner* — Yaovi M Ameh
(74) *Attorney, Agent, or Firm* — Marylou J. Lavoie, Esq. LLC

(57) ABSTRACT

A method for creating controlled scattering effects including (a) disposing at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the ink layer (a); wherein the first cure and the second cure are applied in a manner to control the disposition of the scattering material on top of and penetration into the curable ink layer to control surface and subsurface scattering properties.

18 Claims, 7 Drawing Sheets

(51) Int. Cl.
  *B41M 3/00* (2006.01)
  *B41M 7/00* (2006.01)
  *C09D 11/12* (2006.01)
  *C09D 11/322* (2014.01)

(56) References Cited

U.S. PATENT DOCUMENTS

| | | | |
|---|---|---|---|
| 5,389,958 | A | 2/1995 | Bui et al. |
| 6,260,954 | B1 | 7/2001 | Lima-marques |
| 6,547,380 | B2 | 4/2003 | Smith et al. |
| 7,259,275 | B2 | 5/2007 | Belelie et al. |
| 7,276,614 | B2 | 5/2007 | Toma et al. |
| 7,279,587 | B2 | 5/2007 | Odell et al. |
| 7,563,489 | B2 | 7/2009 | Carlini et al. |
| 7,625,956 | B2 | 12/2009 | Odell et al. |
| 7,632,546 | B2 | 12/2009 | Odell et al. |
| 7,714,040 | B2 | 5/2010 | Toma et al. |
| 8,061,791 | B2 | 11/2011 | Iftime et al. |
| 8,123,347 | B2 | 2/2012 | Odell et al. |
| 2012/0269983 | A1* | 10/2012 | Grinberg ............... B41M 3/006 427/470 |
| 2014/0198168 | A1* | 7/2014 | Pervan ................... B44C 5/04 347/110 |

OTHER PUBLICATIONS

Reflection Models, available on the world wide web at http://www.virial.com/reflection-models.html, not dated.

Brent Burley, Extending the Disney BRDF to a BSDF With Integrated Subsurface Scattering, Walt Disney Animation Studios, Physically Based Shading at Disney, course notes, revised 2014, in ACM SIGGRAPH, "Practical Physcially Based Shading in Film and Game Production," 2012.

Boher et al., New Generation of Fourier Optics Instruments for Fast Multispectral BRDF Characterization, Article in Proceedings of SPIE, The International Society for Electrical Engineering, 9398(16), Feb. 2015.

"Dimer Acids," Kirk-Othmer Encyclopedia of Chemical Technology, vol. 8, 4th Ed. (1992), pp. 223 to 237.

Matusik et al., Printing Spatially-Varying Reflectance, ACM Transactions on Graphics (TOG), vol. 28, Issue 5, Dec. 2009, Article No. 128.

Dong et al., Printing Spatially-Varying Reflectance for Reproducing HDR Images, ACM Transactions on Graphics (TOG), vol. 31, Issue 4, Jul. 2012, Article No. 40.

Dong et al., Fabricating Spatially-Varying Subsurface Scattering, ACM Transactions on Graphics (TOG), vol. 29, Issue 4, Jul. 2010, Article No. 62.

Rouiller et al., 3D-Printing Spatially Varying BRDFs, Published in IEEE Computer Graphics and Applications, vol. 33, Issue 6, Nov.-Dec. 2013.

Pereira et al., Gamut Mapping Spatially Varying Reflectance With an Improved BRDF Similarity Metric, Eurographics Symposium on Rendering 2012, vol. 31 (2012), No. 4.

Malzbender et al., Printing Reflectance Functions, ACM Transactions on Graphics (TOG), vol. 31, No. 3, Article 20, May 2012.

Hasan et al., Physical Reproduction of Materials With Specified Subsurface Scattering, ACM Transactions on Graphics (TOG), vol. 29, Issue 4, Jul. 2010, Article No. 61.

\* cited by examiner 900 dpi 600 dpi 300 dpi

NO POWDER

PARTIAL

FULL POWDER

PRINTING PROCESS FOR PREPARING CONTROLLED SCATTERING EFFECTS

BACKGROUND

Disclosed herein is a process for preparing digitally printed scattering surface effects using ink jet ink and non-ink jettable particles. More particularly disclosed is a method for creating controlled scattering effects comprising (a) disposing at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the ink layer (a); wherein the first cure and the second cure are applied in a manner to control the disposition of the scattering material on top of and penetration into the curable ink layer to control surface and subsurface scattering properties.

Also disclosed is a printing method comprising (a) ink jetting at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the layer (a).

Ink jet inks which contain a dye or pigment, a solvent system, which may be aqueous or non-aqueous and may include a combination of solvents or a single solvent, and various other components are known. These other components may be included to address specific problems relating to ink performance, such as flow characteristics, the ink drying out over time as it sits in the cartridge or when it is deposited through the nozzle during printing, particulate matter in the ink settling out of solution over time, and the like.

A current need is for improved ink compositions suitable for drop based printing. For example, there is a need for improved ink compositions for drop based printing such as tonejet printing which pulls drops with charged particles from the liquid.

Another current need is the ability to digitally print ink jet inks with high concentrations of particles that are too large to jet.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least four types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands. Still another type of drop-on-demand system is tonejet printing comprising an electrostatic drop-on-demand deposition technology. The tonejet process consists of electrostatic concentration and ejection of particles from a fluid. The tonejet print head enables an electric field to be applied to the ink. The tonejet ink comprises electrically charged conventional pigments in a non-conductive liquid. In the tonejet print head, an electric force is applied directly to the charged ink particles. The longer the electric pulse is applied, the more ink is ejected. See, for example, U.S. Pat. No. 6,260,954, which is hereby incorporated by reference herein in its entirety, which describes in the Abstract thereof a method and apparatus for the generation of agglomerations of particulate material in a liquid. Agglomerations are built up at a point under the effect of an electric field and ejected by electrostatic means. The size of the agglomeration is dependent upon the strength of the electric filed, point geometry, the nature of the liquid, and the nature of the particles. Agglomerations of particles in the range of from 1 to 500 microns are produced. The invention is useful for non-impact printing and other applications where delivery of agglomerations of particles is useful such as in inhalable pharmaceuticals.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents bleedthrough on the paper.

In these systems, the crystalline wax inks are jetted onto a transfer member, for example, an aluminum drum, at temperatures of approximately 100° C. to about 130° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

Piezoelectric ink jet techniques are known, and offer a reliable and cost effective means of applying digital images. However, ink jet inks and substances capable of being deposited on a substrate through ink jetting currently are required to have a small particle size and a low solid particle content. Large particles and high loadings make it difficult to combine such solid particles to inkjet technology, especially solvent free ink jet applications, as the particle size impedes normal function of the jetting nozzles and other equipment by, for example, clogging or requiring that the nozzle diameter be so large as to prevent accurate printing.

U.S. Pat. No. 8,123,347, which is hereby incorporated by reference herein in its entirety, describes in the Abstract thereof methods of using inks with gellants that can form a gel state, as receivers for particle materials. The inks are liquid when jetted, but quickly enter a tacky-semi-solid/gel state when cooled below ink gel temperature on a substrate and prior to curing. Dry powders and solid particulate substances of various are then applied to the jetted inks and locked in place when the ink is cured. U.S. Pat. No. 8,123,347 in particular describes the curing of magnetite powders that have been deposited onto ultraviolet curable ink.

Highly pigmented inks with large particles can exhibit desirable high color saturations with thin, and therefore, less expensive, and mechanically more robust ink layers. Concentrated particle inks are also capable of exhibiting controlled properties to exhibit enhanced appearance ranging from metal specular, high gloss, low gloss, and flat appearances. Inclusion of large particulates such as glitters and flakes can further potentially enhance optical appearances. The ability to incorporate particulates with unique chemical, biological, physical, and electrical properties is also highly desirable. Also desirable would be the ability to effect continuous control of optical properties on non-planar surfaces for three-dimensional printed objects as well as the ability to create novel scattering and/or absorbing effects on two-dimensional printed surfaces. However, due to the size and shape requirements for light scattering materials, these particles are too large for ink jet printing.

Currently available processes are suitable for their intended purposes. However a need remains for a process and suitable ink jet inks to enable application of unjettable pigments in a controlled fashion using digital marking technologies.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a method for creating controlled scattering effects comprising (a) disposing at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the ink layer (a); wherein the first cure and the second cure are applied in a manner to control the disposition of the scattering material on top of and penetration of the scattering material into the curable ink layer to control surface and subsurface scattering properties.

Also described is a printing method comprising (a) ink jetting at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the ink layer (a).

DETAILED DESCRIPTION

A printing process and ink jet ink composition for use therein is provided comprising a phase change material, in embodiments, an ultraviolet curable gel ink, and unjettable particles, in embodiments, powdered particulates. The gel ink is deposited, and the particles are applied to the uncured or partially cured gel ink. The low resolution of particulate is overcome by the high resolution of the jettable ultraviolet curable gel ink that is subsequently cured. Also provided is a process to apply relatively large sized scattering particles via an ink jet approach in combination with a non-ink jet disposition of the particles. Excess particles that do not come into contact with or stick to the gel ink can be swept away, and reused in a subsequent printing process, if desired.

The interaction of light upon surfaces is governed by the BRDF (bidirectional reflectance distribution function) or more generally, the BSSRDF (bidirectional scattering-surface reflectance distribution function) plus BRDF. Depending on the nature of the surface, either the glossy, specular, or diffuse backscattering component can dominate. The combination of scattering, surface reflection, and internal refraction is modelled using the BSSRDF (bidirectional scattering-surface reflectance distribution function).

Figure 1:
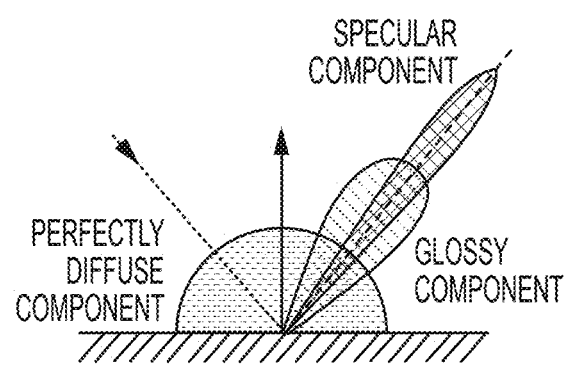
FIG. 1 is a three-component BRDF (bidirectional reflectance distribution function) model.

FIG. 1 is an illustration of a three component BRDF model which can be found on the world wide web at http://www.virial.com/reflection-models.html. The model represents BRDF of a material as a weighted sum of three independent components: diffuse (Lambertian), glossy, and quasi-specular, i.e., having a specular lobe of small but finite width.

Figure 2:
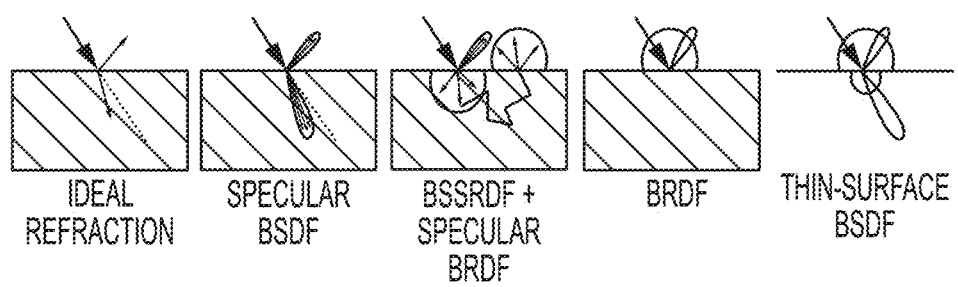
FIG. 2 is an illustration showing various shading model representations of refracted energy.

FIG. 2 is an illustration showing various shading model representations of refracted energy. FIG. 2 comprises boxes which illustrate, from left to right, ideal refraction, specular BSDF, BSSRDF+specular BRDF, BRDF, and thin-surface BSDF. For further detail, see "Extending the Disney BRDF to a BSDF With Integrated Subsurface Scattering," by Brent Burley, Walt Disney Animation Studios, Physically Based Shading at Disney, course notes, revised 2014, in ACM SIGGRAPH, "Practical Physically Based Shading in Film and Game Production," 2012, which is hereby incorporated by reference herein in its entirety.

Light scattering not only has a specular component (white highlights, but also a diffusive component which comes from deep scattering with the material yielding both the translucent property as well as the color. Only the non-absorbed color is able to escape from the depths of the sample to the surface.

Figure 3:
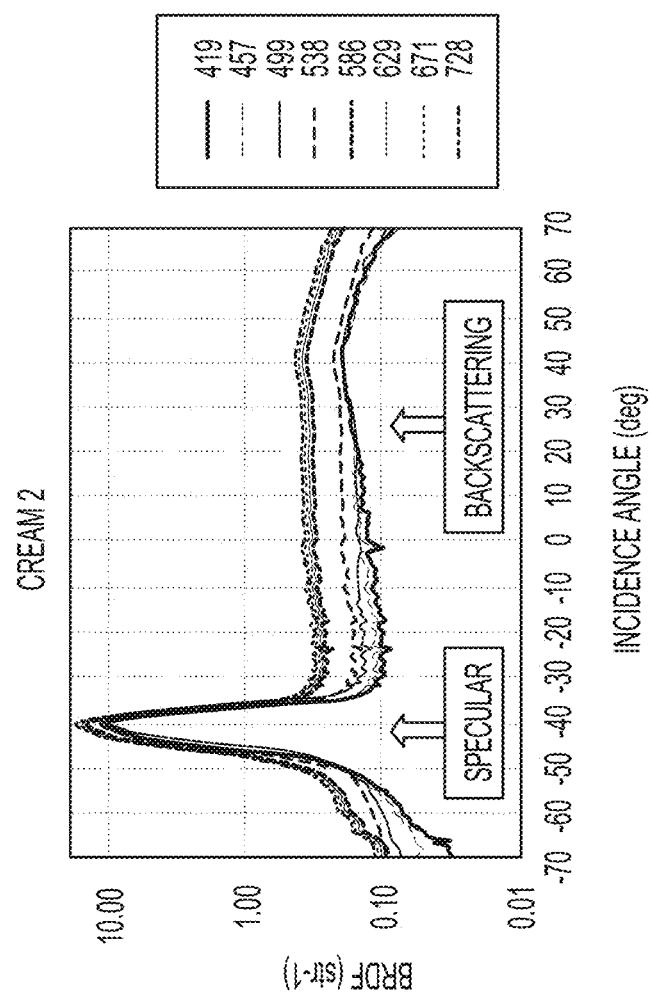
FIG. 3 is a graph illustrating the BRDF for skin at various wavelengths (nm) for a particular cosmetic cream.

FIG. 3 is a graph which can be found on the world wide web at https://www.researchgate.net/figure/BRDF-measured-along-hoizontal-azimuth-on-two-cosmetic-foundation-creams-incidence-angle_271682148. FIG. 3 illustrates the BRDF for skin at various wavelengths (nm) for a particular cosmetic cream. The specular reflection fraction and angular spread is the same for all colors but the diffuse component varies significantly giving the color appearance. For further detail, see "New Generation of Fourier Optics Instruments for Fast Multispectral BRDF Characterization," by Pierre Boher, et al., Proceedings of The International Society for Optical Engineering 9398(16), February 2015, which is hereby incorporated by reference herein in its entirety.

The process herein provides the ability to create a continuously variable surface that can be reflective, glossy, or matte, and is achieved by controlling the surface composition and/or characteristics. In embodiments, the process includes printing different optical elements superimposed upon or within one another. For example, the process comprises printing colored pigments, following by disposing scattering particles therein, following by printing a clear coat thereon having a local roughness much smaller than the wavelength of light.

In embodiments, a method herein for creating controlled scattering effects comprises (a) disposing at least one curable ink layer onto a substrate in an imagewise fashion or in a continuous film fashion; (b) optionally, applying a first cure to partially curing the ink layer (a); (c) disposing at least one scattering material onto the ink layer (a); and (d) applying a second cure to fully cure the layer (c); wherein the optional first cure and the second cure are applied in a manner to control the disposition of the scattering material.

In embodiments, a method herein for creating controlled scattering effects comprises (a) disposing at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the ink layer (a); wherein the first cure and the second cure are applied in a manner to control the disposition of the scattering material on top of and penetration into the curable ink layer to control surface and subsurface scattering properties.

In embodiments, one or more first partial curing steps are performed to control the disposition of the particles on the ink layer surface as well as the degree of penetration of the particles into the ink layer.

In embodiments, step (b) applying a first cure to partially cure the ink layer (a) is performed before step (c) disposing at least one scattering material onto the ink layer (a).

In other embodiments, step (b) applying a first cure to partially cure the ink layer (a) is performed after step (c) disposing at least one scattering material onto the ink layer (a).

In still other embodiments, step (b) applying a first cure to partially cure the ink layer (a) is performed both before and after step (c) disposing at least one scattering material onto the ink layer (a) such that the first partial cure is performed in two steps to effect two partial cures before step (d) applying a second cure to fully cure the ink layer (a). That is, one or more partial cures are applied before, after, or a combination of before and after the particles are deposited in order to control the location of the particles on the ink layer surface and the amount of penetration of the particles into the ink layer. The second, full cure is then applied to fully cure the ink layer.

The method enables creation of more intense scattering layers by alternating powder or particulates with curable ink layers and control of how far the powder or particulate sinks into the ink layer. Thus, the method provides control over the surface and subsurface optical properties not previously available by control of particle density, particle depth, and selection of particle properties. The at least two step curing process including one or more partial cures and final full cure further enable control of the particle placement and thus control of the optical properties.

As used herein, depositing at least one curable ink layer includes depositing at least one curable ink layer wherein curable or curing means at least one of the following: phase change, thermal curing, solvent evaporation, UV (ultra violet) polymerizing, e-beam curing, or other chemical component reactions (ejecting two or more chemical components which react to cure). The two step curing process herein can comprise at least one partial cure and a final full cure. Thus, for example, at least one partial phase change, at least one partial thermal curing step, at least one partial solvent evaporation, at least one partial UV curing, at least one partial e-beam curing, or at least one partial chemical component reaction, can be employed or triggered as a first partial cure before or after deposition of the particles onto the ink layer. The final cure can then be applied according to the selected curing method. In this way, positioning of the particles on the surface of the ink layer and the degree of penetration into the ink layer can be controlled by one or more partial cures before or after particle deposition followed by a final curing step.

The curable ink layer can be disposed on to the substrate in any suitable or desired fashion. In embodiments, (a) disposing at least one curable ink layer onto a substrate comprises ink jetting the curable ink layer.

Any suitable or desired ink jet printing apparatus can be selected for ink jetting the curable ink layer or layers. The curable inks for forming the curable ink layer or layers can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In a specific embodiment, a printing method herein comprises (a) ink jetting at least one curable ink layer onto a substrate in an imagewise fashion or in a continuous film fashion; (b) applying a first cure to partially cure the ink layer (a); (c) disposing at least one scattering material onto the ink layer (a); and (d) applying a second cure to fully cure the layer (a). In embodiments, (c) disposing at least one scattering material onto the ink layer (a) comprises selecting the direction in which the scattering material is disposed in step (c), to achieve a desired surface effect. In embodiments, steps (a), (b), (c), and (d) are selected to provide a continuously variable surface comprising a combination of at least two surface characteristics selected from the group consisting of a smooth surface, a rough surface, a glossy surface, a semiglossy surface, and a matte surface.

Any suitable or desired curable ink can be selected for the curable ink layer or layers of the process herein. In embodiments, the curable ink of (a) comprises an ultraviolet curable ink containing at least one gellant. In embodiments, the at least one curable ink comprises the following components: (i) a radiation curable monomer or prepolymer; (ii) a photoinitiator; (iii) an optional wax; and (iv) a gellant. In certain embodiments, the components (i), (ii), (iii), and (iv) are selected to impart to the ink layer a selected degree of surface tackiness, surface inhibition, or a combination thereof to tune a degree of scattering material sinking within the ink layer (a).

In embodiments, as used herein, surface tackiness means sticky or adhesive to the touch.

In embodiments, as used herein, surface inhibition means oxygen quenching of the reactive elements of UV curable ink (free radicals) that effectively stops the polymerization, leading to surface tackiness.

The ink compositions herein can comprise any suitable curable monomer or prepolymer. In embodiments, the at least one curable monomer or prepolymer is a multifunctional acrylate or methacrylate compound. Examples of suitable materials include radiation curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Different monomer and oligomers can also be added to tune the plasticity or elasticity of the cured objects. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink compositions contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In embodiments, the ink compositions disclosed herein can comprise any suitable photoinitiator. Examples of specific initiators include, but are not limited to, Irgacure® 127, Irgacure® 379, and Irgacure® 819, BASF, among others. Further examples of suitable initiators include (but are not limited to) benzophenones, benzyl ketones, monomeric hydroxyl ketones, polymeric hydroxyl ketones, α-alkoxy benzyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR®, BASF, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (IRGACURE® 819) and other acyl phosphines, 2-methyl-1-(4-methylthio)phenyl-2-(4-morphorlinyl)-1-propanone (available as IRGACURE® 907) and 1-(4-(2-hydroxyethoxy)phenyl)-2-hydroxy-2-methylpropan-1-one (available as IRGACURE 2959®), 2-benzyl 2-dimethylamino 1-(4-morpholinophenyl) butanone-1 (IRGACURE® 369), 2-hydroxy-1-(4-(4-(2-hydroxy-2-methylpropionyl)-benzyl)-phenyl)-2-methylpropan-1-one (available as IRGACURE® 127), 2-dimethylamino-2-(4-methylbenzyl)-1-(4-morpholin-4-ylphenyl)-butanone (available as IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

Optionally, the photoinitiator is present in the phase change ink in any desired or effective amount, in one embodiment at least about 0.5 percent by weight of the ink composition, and in another embodiment at least about 1 percent by weight of the ink composition, and in one embodiment no more than about 15 percent by weight of the ink composition, and in another embodiment no more than about 10 percent by weight of the ink composition, although the amount can be outside of these ranges.

In embodiments, the ink compositions can include a wax, in embodiments, a reactive wax. Any suitable wax or reactive wax can be selected. In embodiments, the reactive wax comprises a curable wax component that is miscible with the other components and that will polymerize with the curable monomer to form a polymer. Inclusion of the wax promotes an increase in viscosity of the ink as it cools from the jetting temperature.

Suitable examples of waxes include, but are not limited to, those that are functionalized with curable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

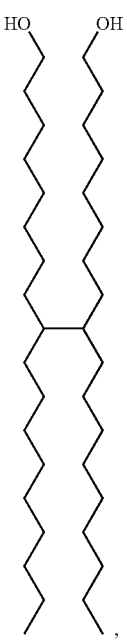 [SMILES: CCCCCCCCCC(CCCCCCCCO)C(CCCCCCCCC)CCCCCCCCO]

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3-(CH_2)_n-COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

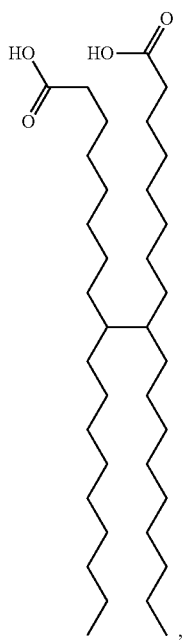 [SMILES: CCCCCCCCCC(CCCCCCCC(=O)O)C(CCCCCCCCC)CCCCCCCC(=O)O]

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

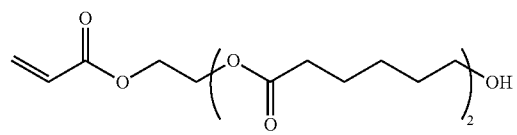

SR495B from Sartomer Company, Inc.;

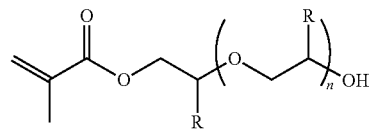

CD572 (R=H, n=10) and SR604 (R=Me, n=4) from Sartomer Company, Inc.

In embodiments, the optional curable wax is included in the ink in an amount of from, for example, about 1 to about 25% by weight of the ink, or from about 2 to about 20% by weight of the ink, or from about 2.5 to about 15% by weight of the ink, although the amounts can be outside of these ranges.

The curable monomer or prepolymer and curable wax together can form more than about 50% by weight of the ink, or at least 70% by weight of the ink, or at least 80% by weight of the ink, although not limited.

Any suitable gellant can be used for the ink compositions herein. In embodiments, gellants suitable for use in the ink compositions herein include a curable gellant comprised of a curable polyamide-epoxide acrylate component and a polyamide component, a curable composite gellant comprises of a curable epoxy resin and a polyamide resin, amide gellants, and the like.

In embodiments, a gellant such as described in U.S. Pat. No. 7,625,956, the disclosure of which is totally incorporated herein by reference, can be used, wherein the gellant is a compound of the formula

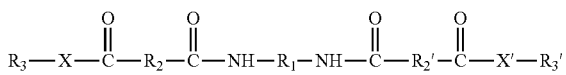

wherein $R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

a) photoinitiating groups, such as groups derived from 14442-hydroxyethoxy)phenyl)-2-hydroxy-2-methylpropan-1-one, of the formula

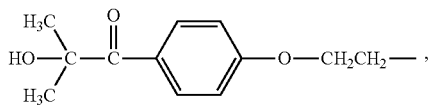

groups derived from 1-hydroxycyclohexylphenylketone, of the formula

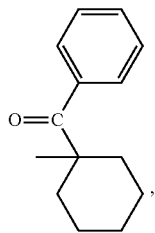

groups derived from 2-hydroxy-2-methyl-1-phenylpropan-1-one, of the formula

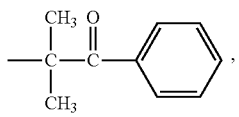

groups derived from N,N-dimethylethanolamine or N,N-dimethylethylenediamine, of the formula

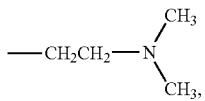

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that at least one of $R_3$ and $R_3'$ is a photoinitiating group;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_3'$ are the same as each other; in another specific embodiment, $R_3$ and $R_3'$ are different from each other.

In one specific embodiment, $R_2$ and $R_2'$ are each groups of the formula $—C_{34}H_{56+a}—$ and are branched alkylene groups which may include unsaturations and cyclic groups, wherein a is an integer of 0, 1, 2, 3, 4, 5, 6, 7, 8, 9, 10, 11, or 12, including (but not limited to) isomers of the formula

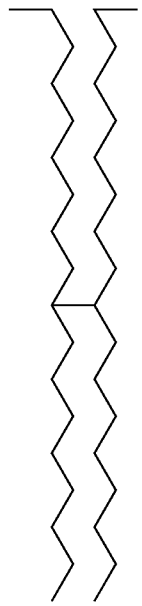

In one specific embodiment, $R_1$ is an ethylene ($—CH_2CH_2—$) group.

In one specific embodiment, $R_3$ and $R_3'$ are both

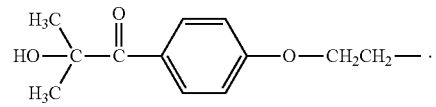

In one specific embodiment, the compound is of the formula

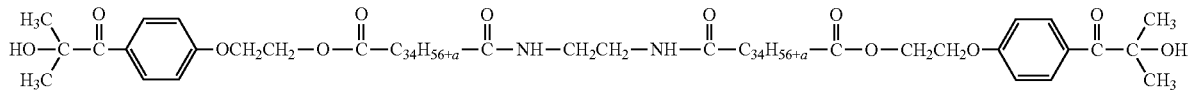

wherein $—C_{34}H_{56+a}—$ represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula

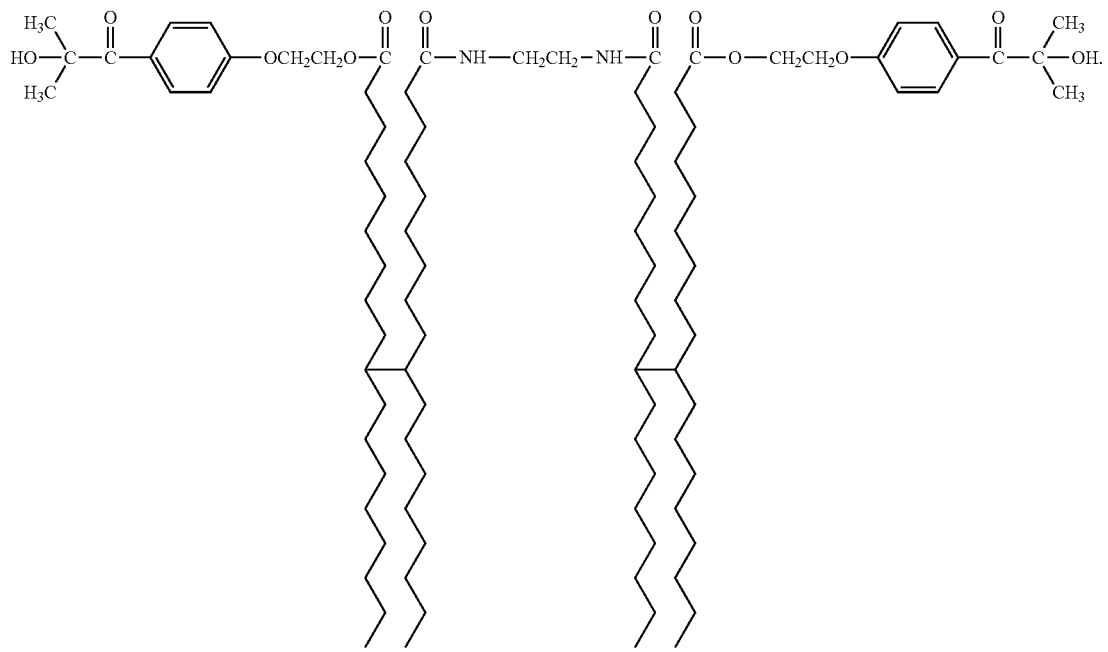
Additional specific examples of compounds of this formula include those of the formula
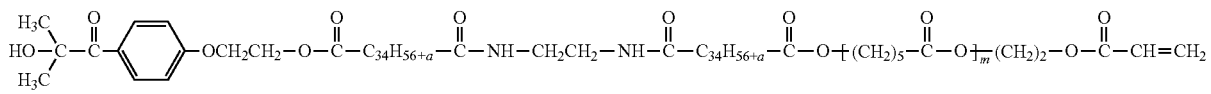
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including (but not limited to) isomers of the formula

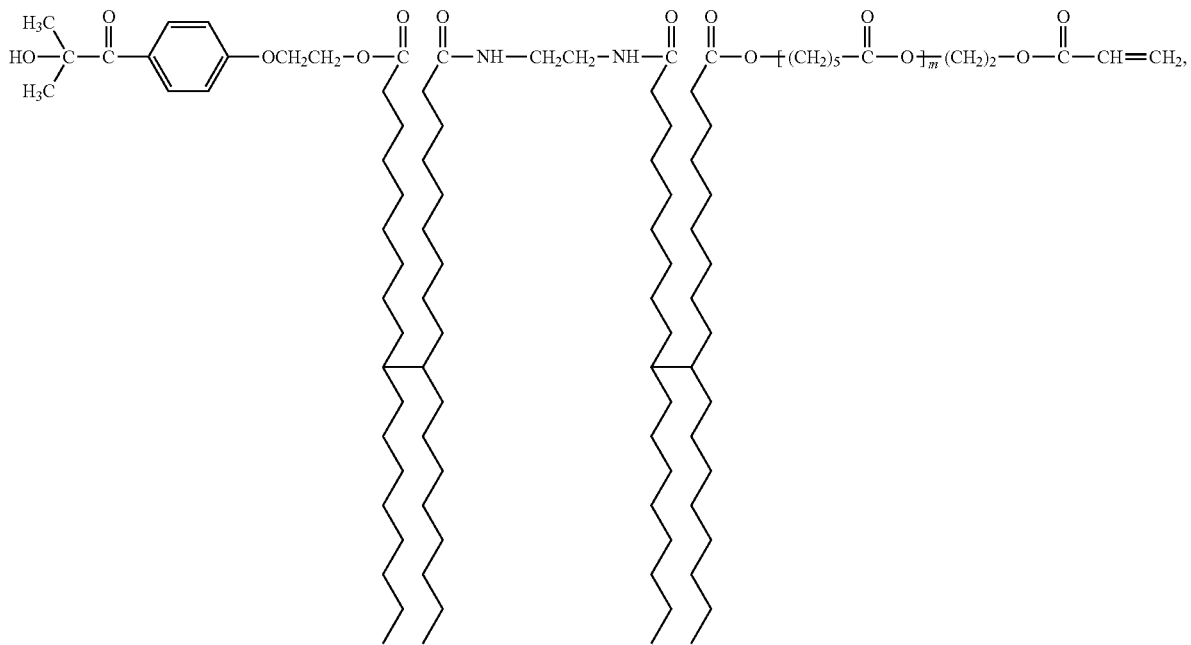
those of the formula
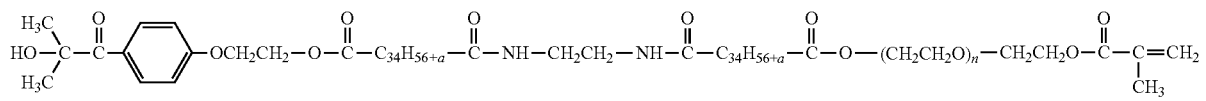
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including (but not limited to) isomers of the formula
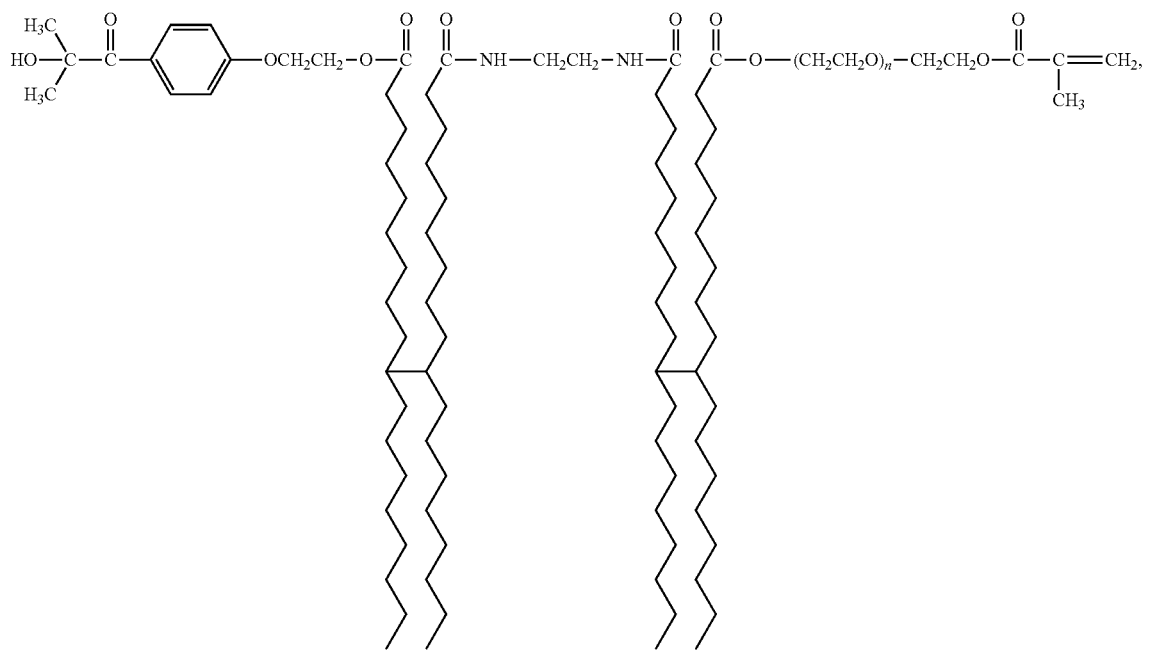

those of the formula

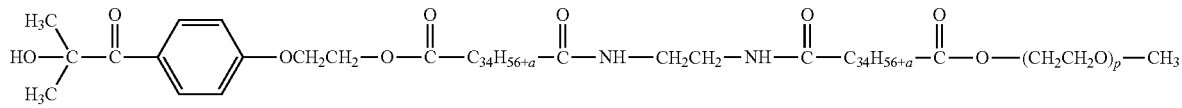

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including but not limited to embodiments wherein p is 2 and wherein p is 3, including (but not limited to) isomers of the formula

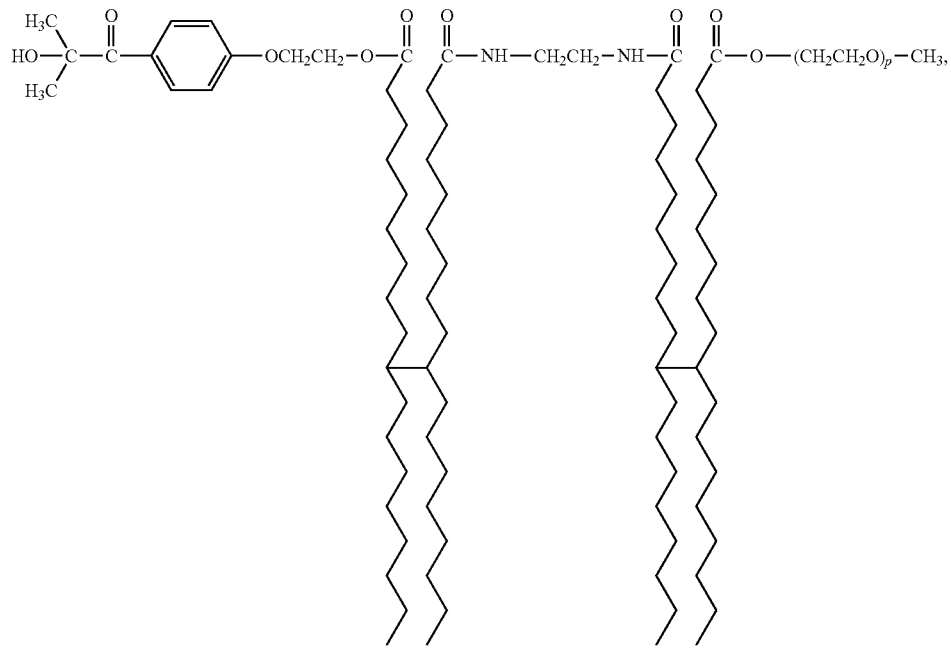

those of the formula

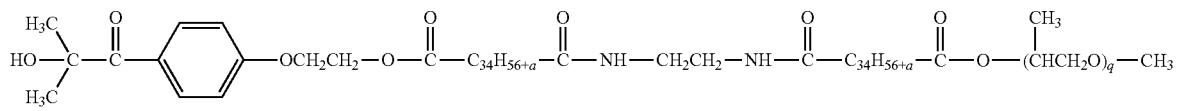

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including but not limited to embodiments wherein q is 2 and wherein q is 3, including (but not limited to) isomers of the formula

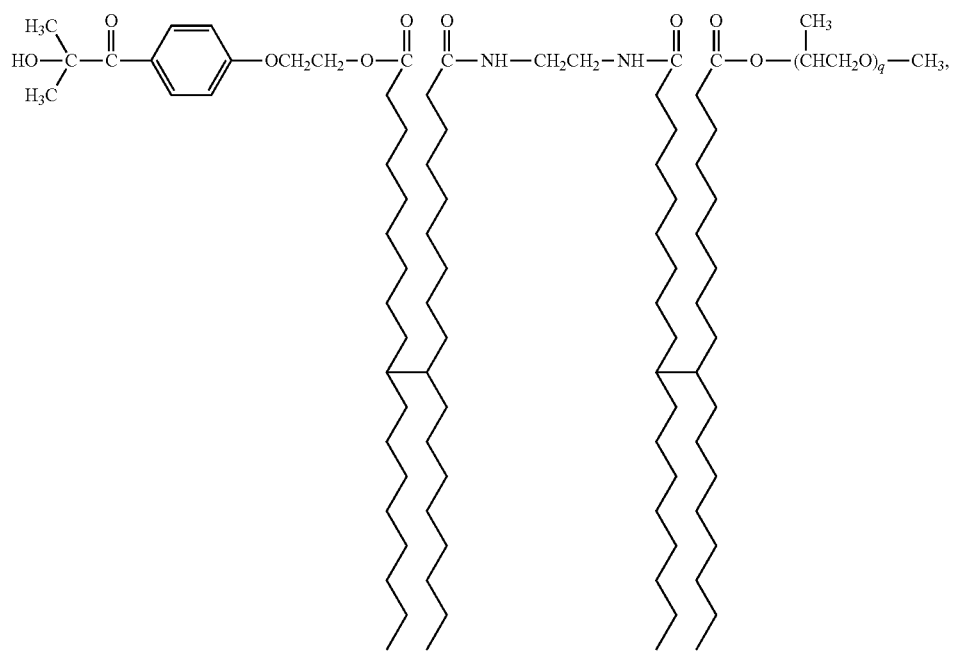
those of the formula
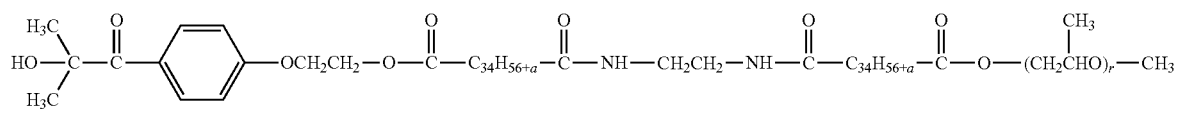
wherein $-C_{34}H_{56+a}-$ represents a branched alkylene group which may include unsaturations and cyclic groups, wherein a is an integer of 0, 1, 2, 3, 4, 5, 6, 7, 8, 9, 10, 11, or 12 and wherein r is an integer, including but not limited to embodiments wherein r is 2 and wherein r is 3, including (but not limited to) isomers of the formula

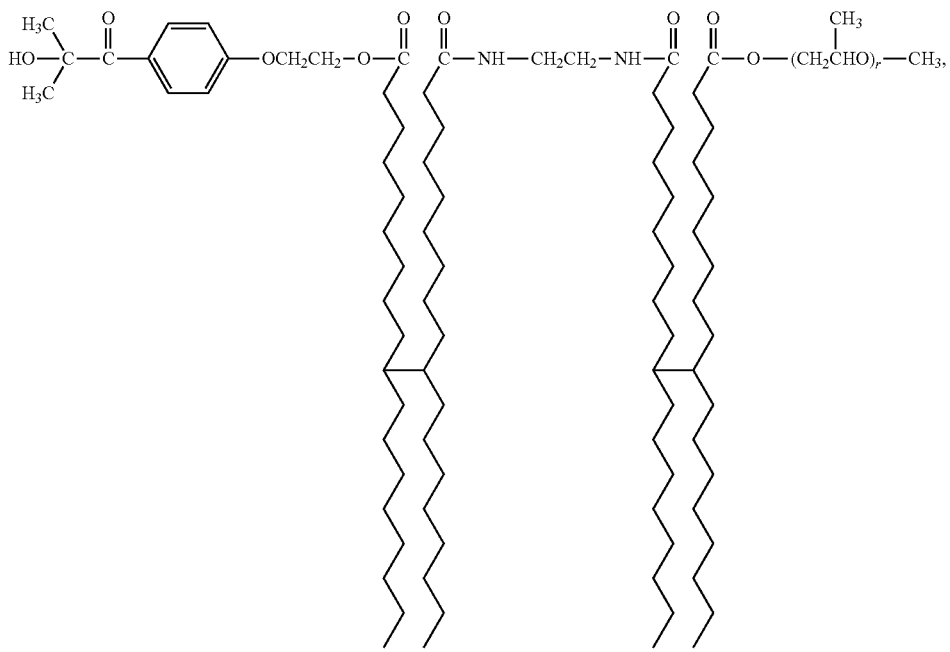

and the like, as well as mixtures thereof.

In embodiments the gellant is a mixture of

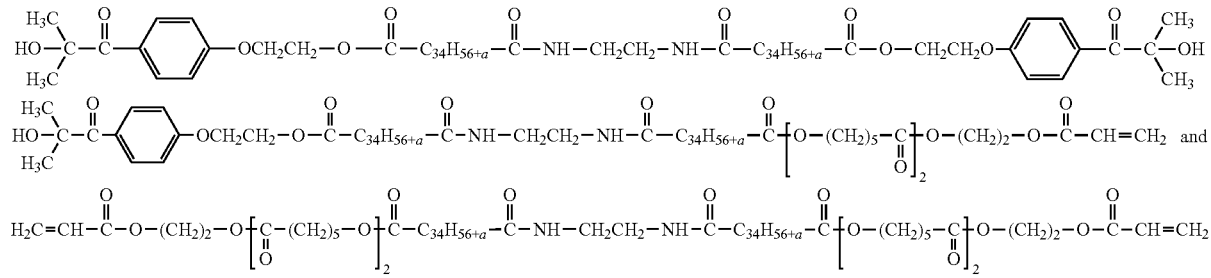

wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12.

In embodiments, gellants herein can comprise materials disclosed in U.S. Pat. No. 7,714,040, the disclosure of which is totally incorporated herein by reference, including a compound of the formula

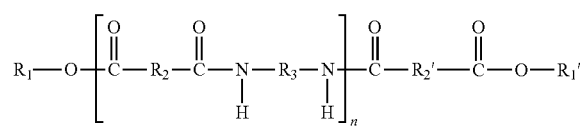

wherein $R_1$ and $R_1{'}$ each, independently of the other, is an alkyl group having at least one ethylenic unsaturation, an arylalkyl group having at least one ethylenic unsaturation, or an alkylaryl group having at least one ethylenic unsaturation, $R_2$, $R_2{'}$, and $R_3$ each, independently of the others, are alkylene groups, arylene groups, arylalkylene groups, or alkylarylene groups, and n is an integer representing the number of repeat amide units and is at least 1.

The gellant compounds as disclosed herein can be prepared by any desired or effective method.

For example, in embodiments, gellants can be prepared as described in U.S. Pat. No. 7,259,275, the disclosure of which is totally incorporated herein by reference, which describes a process for preparing a compound of the formula

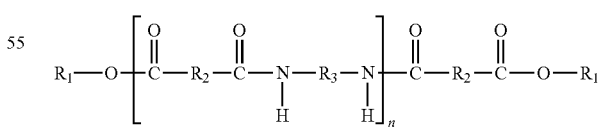

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

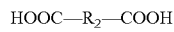

with a diamine of the formula

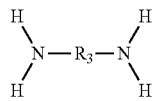

in the absence of a solvent while removing water from the reaction mixture to form an acid-terminated oligoamide intermediate; and (b) reacting the acid-terminated oligoamide intermediate with a monoalcohol of the formula

in the presence of a coupling agent and a catalyst to form the product.

Suitable composite gellants comprised of a curable epoxy resin and a polyamide resin as disclosed in U.S. Pat. No. 7,563,489, which is hereby incorporated by reference herein in its entirety, can also be selected in embodiments herein.

Suitable gellants comprised of a curable polyamide-epoxy acrylate component and a polyamide component as disclosed in U.S. Pat. No. 7,632,546, which is hereby incorporated by reference herein in its entirety, can also be selected in embodiments herein.

Amide gellants as disclosed in U.S. Pat. Nos. 7,276,614 and 7,279,587, which are each hereby incorporated by reference herein in their entireties, can also be selected in embodiments herein.

The gellant may be included in the ink composition in any suitable or desired amount. In embodiments, the gellant is included in an amount of from about 1 to about 50 percent by weight, or from about 2 to about 20 percent by weight, or from about 3 to about 10 percent by weight, based on the total weight of the ink composition.

In embodiments, the ink compositions include a silicone polymer or pre-polymer. Any suitable or desired silicone polymer or pre-polymer can be selected. For example, a linear di-functional acrylate-terminated silicone pre-polymer sold under the name ACR Di-50 is Silmer®, available from Siltech Corporation, can be selected. Dow Corning® 31-441 additive, a solid silicone polymer used as an additive in polyamide-based composites available from Dow Corning Corporation, can also be selected.

In embodiments, the ink compositions herein are substantially colorless. As used herein, "substantially colorless" refers to the ink composition being substantially or completely transparent or clear prior to and after undergoing curing. For this, the composition may be substantially free of colorants. The ink composition herein does not yellow upon curing and remains substantially or completely transparent and clear; that is, little or no measurable difference in any of L* a* b* values, or k, c, m, y is observed. Being "substantially non-yellowing" or "substantially or completely transparent or clear" refers to the ink compositions changing color or hue upon curing in an amount of less that about 15 percent, or less than about 10 percent, or less than about 5 percent, for example, about zero percent.

In embodiments, the ink composition is substantially or completely free of colorants, such as pigments, dyes, or mixtures thereof.

In other embodiments, the ink composition may include one or more optional colorants. The optional colorant, if present, may be present in any suitable or desired amount, for example from about 0.5 to about 75 percent by weight, or about 1 to about 50 percent by weight, or from about 1 to about 25 percent by weight, based on the total weight of the ink composition.

Any suitable colorant can be used in embodiments herein, including dyes, pigments, or combinations thereof. As colorants, examples may include any dye or pigment capable of being dispersed or dissolved in the vehicle. Examples of suitable pigments include, for example, Paliogen® Violet 5100 (BASF); Paliogen® Violet 5890 (BASF); Heliogen® Green L8730 (BASF); Lithol® Scarlet D3700 (BASF); SUNFAST® Blue 15:4 (Sun Chemical 249-0592); HOSTAPERM® Blue B2G-D (Clariant); Permanent Red P-F7RK; HOSTAPERM® Violet BL (Clariant); Lithol® Scarlet 4440 (BASF); Bon Red C (Dominion Color Company); Oracet® Pink RF (Ciba); Paliogen® Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol® Fast Scarlet L4300 (BASF); Sunbrite® Yellow 17 (Sun Chemical 275-0023); Heliogen® Blue L6900, L7020 (BASF); Sunbrite® Yellow 74 (Sun Chemical 272-0558); SPECTRA PAC® C Orange 16 (Sun Chemical 276-3016); Heliogen® Blue K6902, K6910 (BASF); SUNFAST® Magenta 122 (Sun Chemical 228-0013); Heliogen® Blue D6840, D7080 (BASF); Sudan Blue OS (BASF); Neopen® Blue FF-4012 (BASF); PV Fast Blue B2GO1 (Clariant); Irgalite® Blue BCA (Ciba); Paliogen® Blue 6470 (BASF); Sudan Orange G (Aldrich); Sudan Orange 220 (BASF); Paliogen® Orange 3040 (BASF); Paliogen® Yellow 152, 1560 (BASF); Lithol® Fast Yellow 0991 K (BASF); Paliotol® Yellow 1840 (BASF); Novoperm® Yellow FGL (Clariant); Lumogen® Yellow D0790 (BASF); Suco-Yellow L1250 (BASF); Suco-Yellow D1355 (BASF); Suco Fast Yellow Dl 355, Dl 351 (BASF); Hostaperm® Pink E 02 (Clariant); Hansa Brilliant Yellow 5GX03 (Clariant); Permanent Yellow GRL 02 (Clariant); Permanent Rubine L6B 05 (Clariant); Fanal® Pink D4830 (BASF); Cinquasia® Magenta (Du Pont), Paliogen Black L0084 (BASF); Pigment Black K801 (BASF); and carbon blacks such as REGAL330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite™ Turquoise 8GL (Direct Blue 86), available from Classic Dyestuffs; Chemictive Brilliant Red 7BH (Reactive Red 4), available from Chemiequip; Levafix® Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol® Yellow 6GF Clariant; Carta® Blue 2GL, available from Clariant; and the like. Example solvent dyes include spirit soluble dyes such as Neozapon® Red 492 (BASF); Orasol® Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol® Brilliant Yellow 4GF (Clariant); Pergasol® Yellow CGP (Ciba); Orasol® Black RLP (Ciba); Savinyl® Black RLS (Clariant); Morfast® Black Conc. A (Rohm and Haas); Orasol® Blue GN (Ciba); Savinyl® Blue GLS (Sandoz); Luxol® Fast Blue MBSN (Pylam); Sevron® Blue SGMF (Classic Dyestuffs); Basacid® Blue 750 (BASF), Neozapon® Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The radiation curable phase change gellant inks herein can also optionally contain an antioxidant. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® 1-403, and NAUGARD® 959, commercially available from Crompton Corporation, Middlebury, Conn.; IRGANOX® 1010 and IRGASTAB® UV 10, BASF; GENORAD® 16 and GENORAD® 40 commercially available from Rahn AG, Zurich, Switzerland, and the like, as well as mixtures thereof. When present, the optional antioxidant is present in the ink in any desired or effective amount, such as from about 0.01 percent to about 3 percent by weight of the ink carrier, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The radiation curable phase change inks can also, if desired, contain additives to take advantage of the known functionality associated with such additives. Such additives may include, for example, defoamers, slip and leveling agents, pigment dispersants, surfactants, and the like, as well as mixtures thereof. The inks can also include additional monomeric or polymeric materials as desired.

Curing of the ink can be effected by exposure of the ink image to actinic radiation at any desired or effective wavelength, such as from about 200 nanometers to about 480 nanometers, in one embodiment at least about 200 nanometers, and one embodiment no more than about 480 nanometers, although the wavelength can be outside of these ranges. Exposure to actinic radiation can be for any desired or effective period of time, such as for about 0.2 second to about 30 seconds, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature, such as from about 50° C. to about 120° C. (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges), such as from about 2 centipoise to about 30 centipoise, in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink (i.e., from liquid to solid) may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{25}$-fold increase in viscosity.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20° C. to about 25° C.). The inks are gels at ambient temperature.

The present ultraviolet curable gellant ink materials, as well as the methods herein, can be employed with any desired printing system including systems suitable for preparing three-dimensional objects, such as a solid object printer, thermal ink jet printer (both with inks liquid at room temperature and with phase change inks), piezoelectric ink jet printer (both with inks liquid at room temperature and with phase change inks), acoustic ink jet printer (both with inks liquid at room temperature and with phase change inks), thermal transfer printer, gravure printer, electrostatographic printing methods (both those employing dry marking materials and those employing liquid marking materials), and the like. In alternate embodiments, the ink materials can be used for manual preparation of three-dimensional objects, such as through the use of molds or by manual deposition of the ink material, to prepare a desired three-dimensional object.

In a specific embodiment, an ink jet printing device as described in U.S. Pat. No. 8,061,791, which is hereby incorporated by reference herein in its entirety, can be employed. The ink jet printing apparatus includes at least an ink jet print head and a print region surface toward which ink is jetted from the ink jet print head, wherein a height distance between the ink jet print head and the print region surface is adjustable. Therein, the ink jet print head is adjustable in spacing with respect to the print region surface so as to permit the ink jet print head to be moved from the a first position for regular height printing to a second height distance that is greater than (that is, the spacing between the ink jet print head and the print region surface is greater than) the first height distance. The second height distance is not fixed, and can be varied as necessary for a given printing. Moreover, the second height distance can itself be changed during a printing, as necessary. For example, it may be desirable to adjust the height distance from the first position to a second position as an image is built-up by the ink jet print head, and then as the image continues to be built-up, to adjust the ink jet print head from the second position to a third position in which the spacing from the print region surface is even further increased, and so on as necessary to complete build-up of the object or raised text image.

The present disclosure encompasses fabrication of raised images or objects ranging from extremely small objects to extremely large objects. For example, objects of from about 1 micrometer to about to about 10,000 micrometers in height or longest dimension can be prepared, although the height is not limited to these ranges. An appropriate number of passes or ink jettings may be selected so that object can be built up to a desired total print height and a desired shape.

In three-dimensional printing, the printhead or target stage is movable in three dimensions, x, y, and z, enabling the buildup of an object of any desired size. There are no limits to the height or overall size of an object that can be created; however, very large objects may require intermediate curing in the deposition process. In building up an image, for example by way of multiple passes of the print head over the portions of the image to include raised images, by depositing successive layers of ink so that the object, or a section of the object has a desired print height and geometry.

The ink jet head may support single color or full color printing. In full color printing, the ink jet head typically includes different channels for printing the different colors. The ink jet head may include four different sets of channels, for example one for each of cyan, magenta, yellow and black. In such embodiments, the print head is capable of printing either full color regular height prints when the ink jet head is set at a minimum distance from the print region surface, or raised height prints of any color when the ink jet head is at a distance greater than the minimum distance from the print region surface.

For example, the three dimensional objects can be formed with appropriate multiple passing of the ink jet print head over an area to achieve the desired object height and geometry. Jetting of ink from multiple different ink jets of the ink jet head toward a same location of the image during a single pass may also be used to form raised height objects. As discussed above, in embodiments, each layer of ink may add from about 4 μm to about 15 μm in height to the image height. Knowing the total print height desired the appropriate number of passes or jettings may be readily determined.

A controller may then control the ink jet print head to deposit the appropriate amount and/or layers of ink at locations of the image so as to obtain the image with the desired print heights and overall geometries therein.

The three-dimensional objects or raised text images prepared herein can be free standing parts or objects, rapid prototyping devices, raised structures on substrates, such as, for example, topographical maps, or other desired objects.

Thus, in embodiments, the at least one curable ink layer or layers can be employed to provide a surface on a pre-existing flat substrate or raised, three-dimensional substrate, followed by the applying of a first cure, the disposing of one or more scattering materials onto the ink layer, and the applying of a second cure, wherein the optional first cure and second cure are applied in a manner to control the disposition of the scattering material. Alternating, the at least one curable ink layer or layers themselves can be employed to form a flat surface or substrate or to form a three-dimensional object onto which the scattering material can be disposed in accordance with the present method.

In embodiments, the method herein includes wherein steps (a), (b), (c), and (d) are selected to provide a continuously variable surface comprising a combination of at least two surface characteristics selected from the group consisting of a smooth surface, a rough surface, a glossy surface, a semiglossy surface, and a matte surface.

In embodiments, as used herein, a smooth surface means a rms (root mean square) surface roughness that is small compared with the wavelength of light (<lambda/10).

In embodiments, as used herein, a rough surface means a rms surface roughness that is large compared with the wavelength of light >13*lambda).

In embodiments, as used herein, a glossy surface means that the specular highlight at high incident angles reflects light in a narrow cone <1-2 degrees around the specular direction.

In embodiments, as used herein, a semiglossy surface means that the specular highlight at high incident angles reflects light in a broadened cone <10 degrees around the specular direction but there are still discernable highlights.

In embodiments, as used herein, a matte surface means that there are no specular highlights. The angular light distribution approximates a lambertian reflectance.

The at least one scattering material can comprise any suitable or desired material, in embodiments for producing desired optical properties, such as a surface characteristic, a scattering effect, and/or absorbing effects.

The scattering material may comprise any suitable or desired shape or configuration. Exemplary shapes can include, without limitation, needle-shaped, granular, globular, platelet-shaped, acicular, columnar, octahedral, dodecahedral, tubular, cubical, hexagonal, oval, spherical, dendritic, prismatic, amorphous shapes, and the like. An amorphous shape is defined in the context of the present disclosure as an ill-defined shape having a recognizable shape. For example, an amorphous shape has no clear edges or angles. In embodiments, the ratio of the major to minor size axis of the single nanocrystal (D major/D minor) can be less than about 10:1, less than about 2:1, or less than about 3:2. In a specific embodiment, the magnetic core has a needle-like shape with an aspect ratio of about 3:2 to less than about 10:1.

In embodiments, the scattering material comprises a spherical shape having an average particle size (such as particle diameter or longest dimension) total size including core and metallic coating of from about 3 to about 500 nanometers (nm), or about 10 to about 500 nm, or about 10 to about 300 nm, or about 10 to about 50 nm, or about 5 to about 100 nm, or about 2 to about 20 nm, or about 25 nm. In embodiments, the metal layer is a thin film layer having a thickness of from about 1 nanometer to about 10 nanometers. Herein, "average" particle size is typically represented as $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy or from Dynamic Light Scattering measurements.

In embodiments, the scattering material is a material having at least one characteristic selected from the group consisting of a high aspect ratio, a large particle size, and an unjettable material.

In embodiments, as used herein, a high aspect ratio means an aspect ratio of from greater than about 3 to about 1 or from about 3 to about 1.

In embodiments, as used herein, a large particle size means a volume average particle diameter of from about 5 micrometers to about 20 micrometers.

In embodiments, as used herein, an unjettable scattering material means a material that cannot be jetted from a typical ink jet print head apparatus, in embodiments, an unjettable scattering material is a material that is incapable of being jetted from an ink jet print head nozzle because the scattering material is too large.

In embodiments, the scattering material is selected from the group consisting of pigments, fine particle dispersions, glass beads, metallic powders, metallic flakes, glitters, fine fibers, and combinations thereof.

The scattering material can be applied in any suitable or desired manner. In embodiments, the scattering material may be added from a storage device by any known method, in embodiments, by use of static electric rollers, sifting or dropping apparatus, magnetic devices, forced air propulsion apparatus, other known techniques, and combinations thereof.

In certain embodiments, the scattering material is disposed in a manner comprising selecting the direction in which the scattering material is disposed in step (c) to achieve a desired surface effect. In embodiments, disposing the scattering material comprises disposing in a direction selected from the group consisting of a process direction, a cross-process direction, multiple directions, and combinations thereof.

"Process direction" refers to the direction in which the image receiving member or substrate is moving as the imaging surface passes the print head to receive the ejected ink and "cross-process direction" refers to the direction across the width of the image receiving member. While the scattering material is not disposed by jetting, applying the scattering material can be considered as applying in a process direction, a cross-process direction, multiple directions, and combinations thereof with respect to the substrate and the apparatus selected to dispose the scattering material.

In embodiments, one or more of the layers disposed in the method can be planarized. The method herein can further comprise (e) disposing at least one coating layer, in embodiments over the layer or layers (c), and, optionally, planarizing the coating layer.

The coating layer can comprise any suitable or desired composition including, in embodiments, an ink composition as described herein, included clear, colored, transparent, including tinted or colored transparent ink compositions. The coating layer can also be selected from other known clear or colored coating layers.

In embodiments, the method herein further comprises (f) disposing at least one colored scattering layer to control subsurface scattering.

In embodiments, as used herein, a colored scattering layer means a layer where the light scattering length for one color is much longer than the absorption length while for other colors (wavelengths of light) the absorption length is greater than the scattering length. Hence, only the former light escapes into a matte or wide angular distribution of emerging light.

In embodiments, (c) disposing at least one scattering layer comprises disposing at least one intense scattering layer. As used herein, scattering layer means a layer having a thickness that is comparable, in embodiments, substantially equal, to the scattering layer length.

As used herein, an intense scattering layer has such a short scattering length that most light, in embodiments, substantially all light, is scattered back to the surface while in a scattering layer, some fraction of the light passes through the layer into layers below.

In embodiments, as used herein, intense scattering layer means a scattering layer having a thickness that is significantly greater than the scattering layer length. In embodiments, an intense scattering layer comprises a scattering layer having a thickness that is about 50 percent greater than the scattering layer length.

The method can further comprise removing excess scattering material from the substrate or ink layer or layers or coating layer or layers. Excess scattering material not embedded within the jetted ink in the uncured or cured state can be removed by any known method including forced air, magnetic force, static electric force, or simple physical or gravitational removal.

In embodiments, the excess scattering material, after removal, may be returned to a storage device to be reapplied to later jetted ink layers on substrates. In this way, the scattering materials are recycled and thus not wasted.

Any suitable substrate, recording sheet, or removable support, stage, platform, and the like, can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, rough paper, and the like, transparency materials, fabrics, textile products, plastics, polymeric films, inorganic substrates such as metals and wood, as well as meltable or dissolvable substrates, such as waxes or salts, in the case of removable supports for free standing objects, and the like.

In embodiments, the substrate is selected from the group consisting of plain paper, bond paper, silica coated paper, glossy coated paper, transparency material, plastic, polymeric film, metal, wood, wax, and salt. In certain embodiments, the substrate is a specular metallic silver substrate.

In embodiments, the substrate comprises a flat substrate or a two-dimensional surface, a three-dimensional substrate or a three-dimensional surface, or a combination thereof.

By "three dimensional," or grammatic forms thereof, such as 3-D, is meant to relate to a structure composed of plural layers that aggregate or assemble to yield a form, a shape, a construct, an object and the like that, for example, need not be applied to a surface or structure, can be autonomous and/or has a thickness or depth. Printing as used herein includes producing 3-D structures. Printing on a surface or structure also is used herein to include forming a 3-D structure by deposition of plural layers of ink. Often, the first layer is printed on a support, surface, substrate or structure. Successive layers are placed thereon and the already deposited (and optionally adhered or solidified) layer or layers is considered herein a surface or a substrate.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

An ultra-violet curable phase change gellant ink was prepared having the components in the amounts set forth in Table 1. All of the components were stirred together at 90° C. for 1 hour.

TABLE 1

| Component | Weight Percent |
|---|---|
| SR 9003 | 81.8 |
| Amide Gellant | 7.5 |
| SR399LV | 5 |
| I819 | 1 |
| KIP 150 | 3.5 |
| ACR Di-50 | 1 |
| Irgastab ® UV10 | 0.2 |

SR 9003 is a difunctional acrylate monomer (propoxylated neopentyl glycol diacrylate) available from Sartomer Co., Inc.).

Amide Gellant is a curable amide gellant prepared as described in Example VIII of U.S. Pat. No. 7,279,587, which is hereby incorporated by reference herein in its entirety.

SR 399LV is a dipentaerythritol pentaacrylate available from Sartomer Co., Inc.

1819 is a photoinitiator (obtained from Ciba Specialty Chemicals).

KIP 150 is a photoinitiator, oligo[2-hydroxy-2-methyl-1-[4-(1-methylvinyl)phenyl]propanone] (available as Esacure® KIP 150 from Lamberti).

ACR Di-50 is Silmer® linear di-functional acrylate-terminated silicone pre-polymer, available from Siltech Corporation.

Irgastab® UV10 is a free radical scavenger available from BASF.

Example 2

Figure 4:
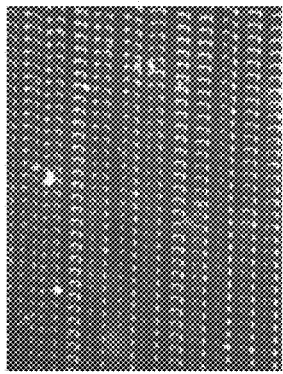
FIG. 4 is an illustration of various printed patterns using an ultraviolet curable gel ink printed at 300 dots per inch (dpi), 600 dpi, and 900 dpi.
Figure 4:
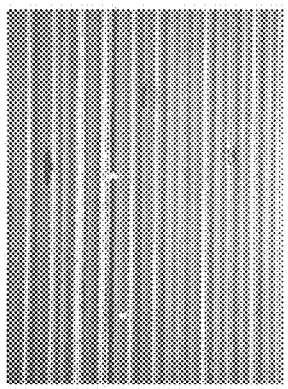
Figure 4:
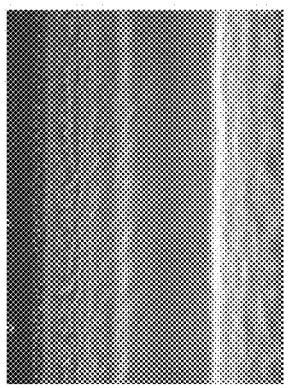

Various ink patterns were printed using the ink of Example 1. The ink patterns were printed using an ink jet printer at 300 dpi (dots per inch), 600 dpi, and 900 dpi as illustrated in FIG. 4. The patterns ranged from continuous film at 300 dpi, to bands at 600 dpi, to discrete spatially resolved droplets at 900 dpi.

Next, a fine fumed silica powder having a particle size of 1 to 5 micrometers, obtained from Sigma-Aldrich®, was blown onto the array of uncured ink patterns using a nozzle attached to a bellows. The excess powder was blown away with a gentle stream of compressed air. The particle coated printed array was then cured under a 395 nanometer LED lamp to furnish the final coating.

Figure 5:
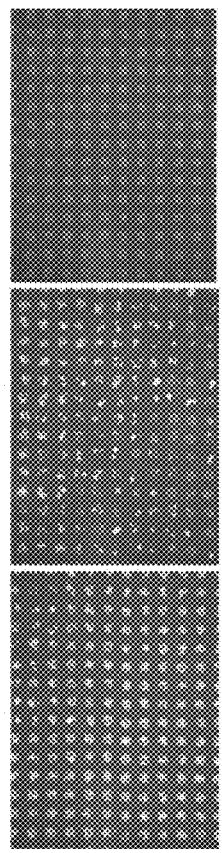
FIG. 5 is an illustration of powder loading on scattering appearance.
Figure 5:

Experiments were carried out to determine the impact of powder loading and powder application direction. The effects of powder loading on scattering appearance is illustrated in FIG. 5. The process herein provides the ability to achieve heavily particulate loaded dots at ink jet resolutions despite the use of a 1 millimeter resolution powder jet. Moreover, the level of particulate loading is controlled by duration and concentration of the particulate jet exposure during the uncured state of the gel ink layer. In addition, the process provides for controlling the temperature during powder exposure to control viscosity and therefore the nature and concentration of particulate incorporation in the ink. FIG. 5 shows an illustration of full powder, particle powder, and no powder, top row, left to right, and a close-up illustration of full power and no powder, bottom row, left to right.

Figure 6:
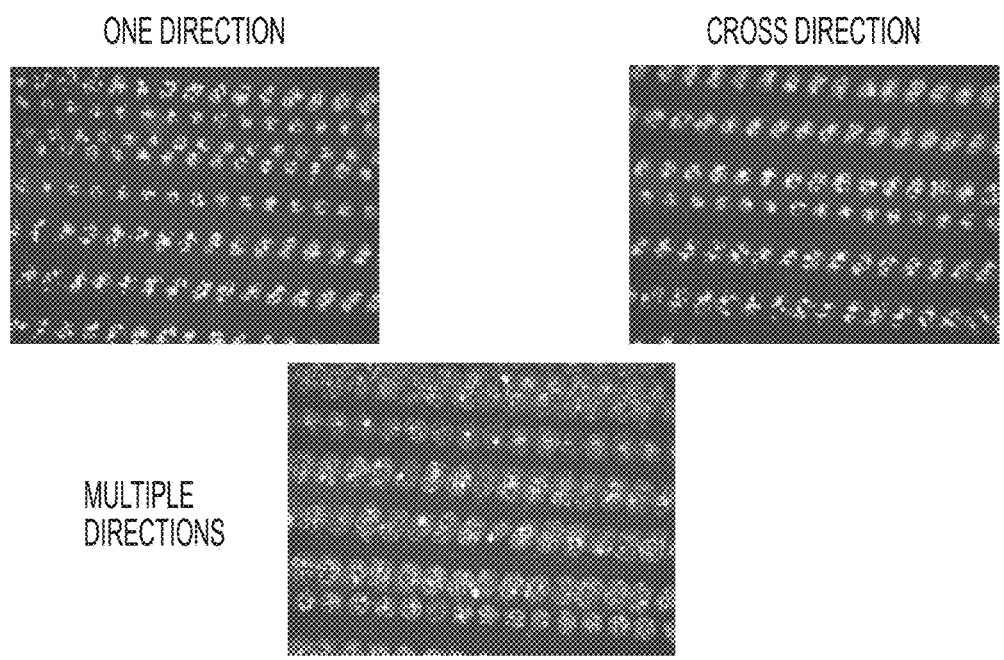
FIG. 6 is an illustration of the effects of powder direction.

FIG. 6 illustrations the effect of powder direction. In FIG. 6, the results of various directions of particle exposure on the subsequent particulate incorporation is illustrated. FIG. 6, top row, shows powder disposal in one direction and cross direction, respectively. FIG. 6, bottom row, shows powder disposal in multiple directions.

Various layers are provided to control the combined color and scattering properties including those ranging from matte finishes to specular colored scattering surfaces. The process also provides the ability to control subsurface scattering to achieve translucent properties such as those properties demonstrated by plastics or human skin.

In embodiments, a layered structure is provided for controlled bidirection reflectance distribution function. In embodiments, there are provided metallic layers at the bottom, then scattering layers with various pigments thereover, optionally, a colored transparent layer or layers thereover, and finally one or more of a smooth, glossy, semiglossy, or matte surface layer to control the specular components.

Figure 7:
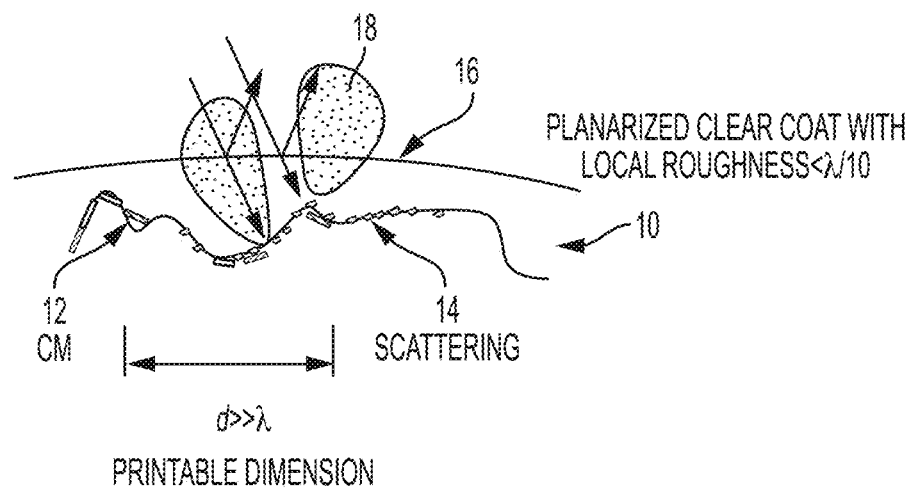
FIG. 7 is an illustration of general scattering layer printing

FIG. 7 illustrates a layered structure for controlled bidirection reflectance distribution function. In FIG. 7, a printable dimension d is shown wherein on a substrate 10, a CM or CMY (cyan, magenta, yellow) layer 12 is disposed. Scattering particles 14 are disposed on CMY layer 12. A clear coating layer 16 is disposed over the scattering layer 14 and planarized to a local roughness of <λ/10. Green areas 18 (shaped similar to a guitar pick) represent the amplitude of the light scattered around the specular direction in polar coordinates with the origin at the "guitar pick point."

In embodiments, a layered structure is provided for controlled bidirection subsurface scattering distribution function. In embodiments, there are provided metallic layers at the bottom, then scattering layers with various pigments thereover, optionally, a colored scattering layer or layers thereover to control the subsurface scattering, and finally one or more of a smooth, glossy, semiglossy, or matte surface layer to control the specular components.

Figure 8:
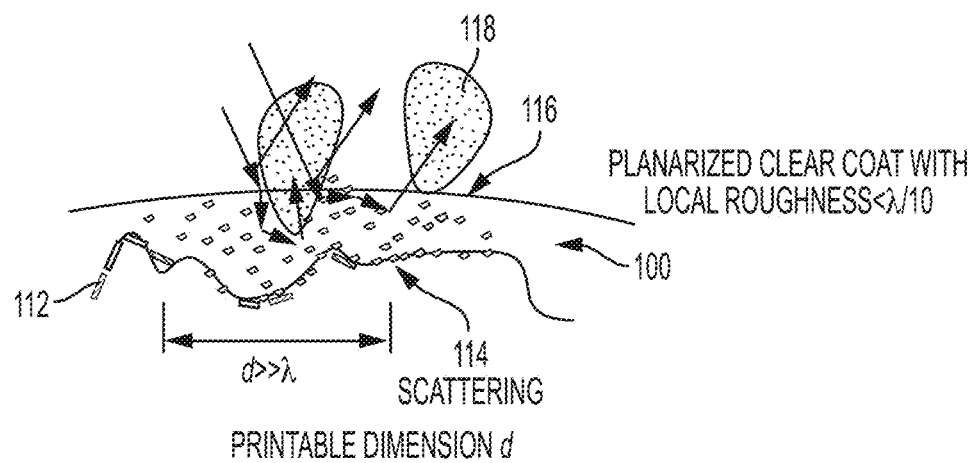
FIG. 8 is an illustration of layer structure for controlled bidirectional subsurface scattering distribution function.

FIG. 8 illustrates a layer structure for controlled bidirection subsurface scattering distribution function. In FIG. 8, a printable dimension d is shown wherein on a substrate 100, a CMY (cyan, magenta, yellow) layer 112 is disposed. Scattering particles 114 are disposed on CMY layer 112. A clear coating layer 116 is disposed over the scattering layer 114 and planarized to a local roughness of <λ/10. Green areas 118 (shaped similar to a guitar pick) represent the amplitude of the light scattered around the specular direction in polar coordinates with the origin at the "guitar pick point."

Figure 9:
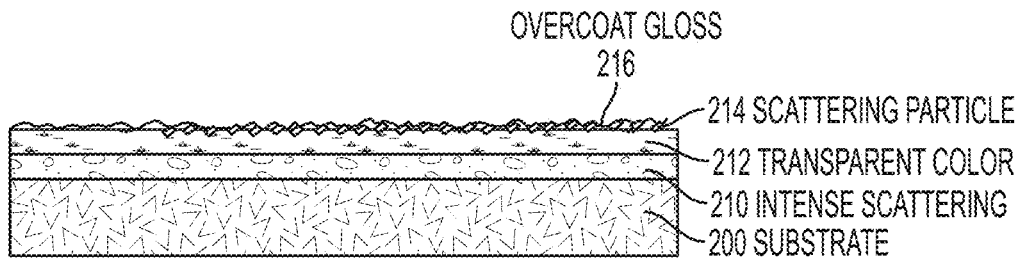
FIG. 9 is an illustration of a general layer structure to control most aspects of the combined color and scattering gamut of surfaces.

FIG. 9 illustrates a general scattering layer printing structure to control most aspects of the combined color and scattering gamut of surfaces. A substrate 200 is provided over which an intense scattering layer 210 is disposed. A transparent color layer 212 is disposed over intense scattering layer 210. A scattering particle layer 214 is disposed over the transparent color layer. An overcoat gloss layer 216 is disposed over scattering particle layer 214. In embodiments, the substrate 200 is specular metallic silver to enable all possible scattering combinations and to enable print layers having the necessary smoothness for mirror like finishes.

Figure 10:
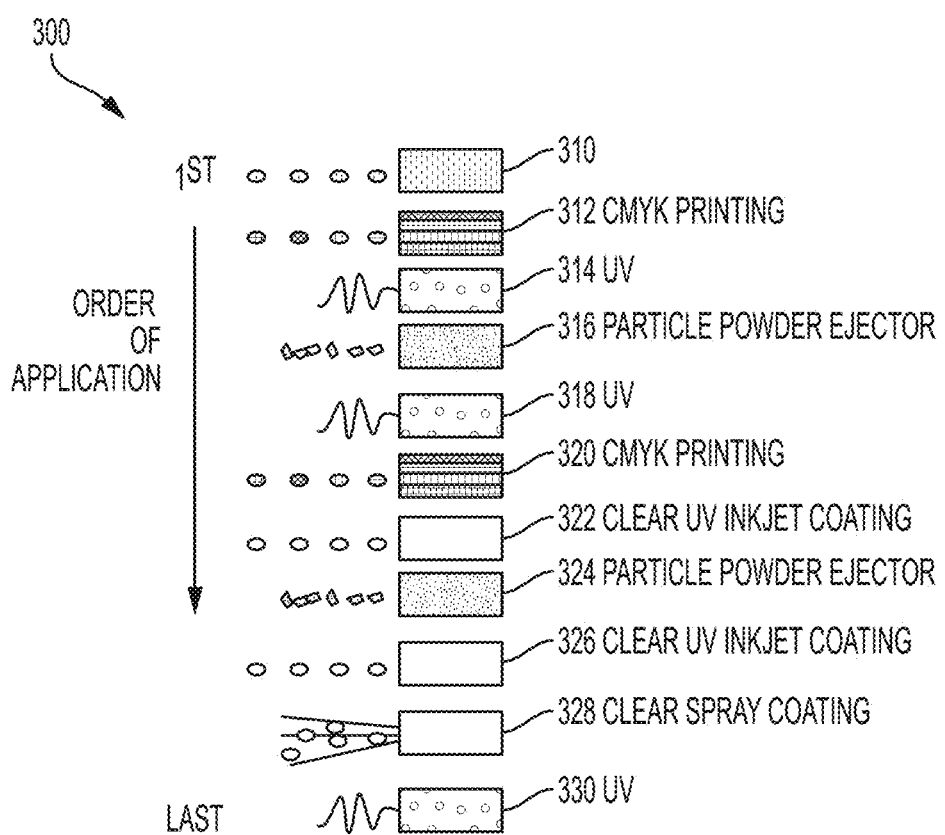
FIG. 10 is an illustration of multiple pass or multiple print heads for printing the various layers in accordance with the present process.

Multiple pass or multiple heads are employed to print the various layers needed to control the combined color and scattering gamut in accordance with the process herein. In embodiments, a specular metallic silver substrate is selected to achieve all possible scattering combinations and to achieve print layers with the necessary smoothness for mirror like finishes. FIG. 10 provides an illustration of a print head layer order to achieve the desired scattering and color properties with the process herein. In FIG. 10, a print head array 300 is illustrated wherein in order of application, first to last, as shown with the arrow, an optional underlayer 310 is jetted onto a substrate. Next, one or more CMYK layers 312 are printed. An optional partial curing station 314 can be employed for partial cure of the ink layer. Particle powder ejector 316 is provided to dispose a particle layer onto the one or more CMYK layers (which may be uncured or partially cured). Another curing station 318 may be employed to further partially cure or fully cure the particle coated CMYK layers. Another CMYK print head array 320 is provided to jet one or more ink layers. Clear ultraviolet ink jet coating head 322 is provided to jet a clear coating. Particle powder ejector 324 is provided to dispose particles over the clear coating layer. Clear ultraviolet ink jet coating head 326 is provided to jet a clear curable coating over the particle powder layer. A clear ultraviolet spray coating head 328 is provided to spray a curable coating layer. A curing station 330 is provided to effect a final cure. Of course, the process can comprise using fewer or more heads, jets, and curing stations in any suitable or desired order. A single curing station, for example, can be provided and the substrate cycled therethrough for multiple curing events. Similarly, a single CMYK ink jet array can be provided and the substrate cycled through as desired.

Thus is provided a process for digital application of controlled scattering effects using unjettable particles. Ink jet printing is employed to deposit a receiving layer for the large particles. The process enables large arrays of digital imaging on two dimensional and three dimensional surfaces not previously possible with such large particles. In various embodiments, the process comprises disposing heavy particle layers using ink jets and powder deposition techniques to generate scattering surfaces and to achieve highly saturated colors, and unique mechanical, chemical, and physical properties. Ink jet printed surfaces with a controllable degree of scattering is afforded by deposition of unjettable scattering materials including, for example, pigments, fine particle dispersions, glass beads, metallic powders, metallic flakes, glitters, fine fibers, and combinations thereof.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A method for creating controlled scattering effects comprising:
    (a) disposing at least one curable ink layer onto a substrate in an imagewise fashion or in a continuous film fashion with at least one curable ink that comprises (i) a radiation curable monomer or prepolymer; (ii) a photoinitiator; (iii) an optional wax; and (iv) a gellant;
    (b) applying a first cure to partially cure the ink layer (a);
    (c) disposing at least one scattering material onto the ink layer (a); and
    (d) applying a second cure to fully cure the ink layer (a);
    wherein the first cure and the second cure are applied in a manner to control the disposition of the scattering material on top of and penetration of the scattering material into the curable ink layer to control surface and subsurface scattering properties; and
    wherein the components (i), (ii), (iii), and (iv) are selected to impart to the ink layer a selected degree of surface stickiness, surface inhibition, or a combination thereof to tune a degree of scattering material sinking within the ink layer (a).

2. The method of claim 1, wherein (a) disposing at least one curable ink layer onto a substrate comprises ink jetting the curable ink layer.

3. The method of claim 1, wherein steps (a), (b), (c), and (d) are selected to provide a continuously variable surface comprising a combination of at least two surface characteristics selected from the group consisting of a smooth surface, a rough surface, a glossy surface, a semi-glossy surface, and a matte surface.

4. The method of claim 1, wherein step (b) applying a first cure to partially cure the ink layer (a) is performed before step (c) disposing at least one scattering material onto the ink layer (a).

5. The method of claim 1, wherein step (b) applying a first cure to partially cure the ink layer (a) is performed after step (c) disposing at least one scattering material onto the ink layer (a).

6. The method of claim 1, wherein step (b) applying a first cure to partially cure the ink layer (a) is performed both before and after step (c) disposing at least one scattering material onto the ink layer (a) such that the first partial cure is performed in two steps to effect two partial cures before step (d) applying a second cure to fully cure the ink layer (a).

7. The method of claim 1, claim 1, further comprising:
    selecting the direction in which the scattering material is disposed in step (c), to achieve a desired surface effect.

8. The method of claim 1, further comprising:
    selecting the direction in which the scattering material is disposed in step (c), to achieve a desired surface effect;
    wherein the direction is selected from the group consisting of a process direction, a cross-process direction, multiple directions, and combinations thereof.

9. The method of claim 1, further comprising:
    (e) disposing at least one coating layer over the layer (c), and optionally, planarizing the coating layer.

10. The method of claim 1, further comprising planarizing one or more of the layers.

11. The method of claim 1, further comprising removing excess scattering material from the substrate or ink layer.

12. The method of claim 1, wherein the scattering material is a material having at least one characteristic selected from the group consisting of a high aspect ratio, a large particle size; and an unjettable material;
    wherein a high aspect ratio comprises a ratio of from about 3 to about 1;

wherein a large particulate material comprises a particle having a volume average particle diameter of from about 5 to about 20 micrometers; and wherein an unjettable material is a material that is incapable of being jetted from an ink jet print head nozzle.

13. The method of claim 1, wherein the scattering material is selected from the group consisting of pigments, fine particle dispersions, glass beads, metallic powders, metallic flakes, glitters, fine fibers, and combinations thereof.

14. The method of claim 1, wherein the substrate comprises a two-dimensional surface, a three-dimensional surface, or a combination thereof.

15. The method of claim 1, wherein the substrate is selected from the group consisting of plain paper, bond paper, silica coated paper, glossy coated paper, transparency material, plastic, polymeric film, metal, wood, wax, and salt.

16. The method of claim 1, wherein the substrate is a specular metallic silver substrate.

17. The method of claim 1, further comprising:
(f) disposing at least one colored scattering layer to control subsurface scattering.

18. The method of claim 1, wherein (c) disposing at least one scattering layer comprises disposing at least one intense scattering layer.

* * * * *